(12) United States Patent  
Kim et al.

(10) Patent No.: US 9,280,210 B2
(45) Date of Patent: Mar. 8, 2016

(54) OPTICAL INPUT APPARATUS WHEREIN LIGHT SOURCES SELECTIVELY EMIT LIGHT AS THE APPARATUS IS INCLINED

(71) Applicant: Samsung Electronics Co., Ltd., Gyeonggi-do (KR)

(72) Inventors: Kang-Nam Kim, Gyeonggi-do (KR); In-Kuk Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 147 days.

(21) Appl. No.: 14/092,341

(22) Filed: Nov. 27, 2013

(65) Prior Publication Data

US 2014/0166851 A1 Jun. 19, 2014

(30) Foreign Application Priority Data

Dec. 18, 2012 (KR) .......................... 10-2012-0148925

(51) Int. Cl.
*G06F 3/03* (2006.01)
*G06F 3/038* (2013.01)
*G06F 3/0354* (2013.01)

(52) U.S. Cl.
CPC ............ *G06F 3/0308* (2013.01); *G06F 3/0317* (2013.01); *G06F 3/0386* (2013.01); *G06F 3/03545* (2013.01)

(58) Field of Classification Search
CPC .............. G06F 3/03545; G06F 3/0386; H05B 37/0272
USPC ............ 250/227.13, 221, 227.22, 205, 208.1; 345/160–168, 170–173, 179–183; 200/51.07, 61.58 R, 61.52, 61.45 R; 362/23.21, 118, 120; 315/76, 120
See application file for complete search history.

(56) References Cited

U.S. PATENT DOCUMENTS

2004/0263346 A1* 12/2004 Neal ........................ 340/815.45
2007/0114367 A1   5/2007 Craven-Bartle et al.
2010/0328272 A1  12/2010 Craven-Bartle et al.

* cited by examiner

Primary Examiner — Que T Le
(74) Attorney, Agent, or Firm — The Farrell Law Firm, P.C.

(57) ABSTRACT

An optical input apparatus is provided. The optical input apparatus includes a body having an image sensor; a plurality of light sources provided in the body to emit light; and a controller configured to control emission of light by the plurality of light sources as a function of a pattern received by the image sensor, wherein the plurality of light sources selectively emit light according to a location of a local saturation of light received by the image sensor.

15 Claims, 8 Drawing Sheets

(a)

TILTED LED (b)

OPTICAL INPUT APPARATUS WHEREIN LIGHT SOURCES SELECTIVELY EMIT LIGHT AS THE APPARATUS IS INCLINED

PRIORITY

This application claims priority under 35 U.S.C. §119(a) to Korean Application Serial No. 10-2012-0148925, which was filed in the Korean Intellectual Property Office on Dec. 18, 2012, the entire content of which is incorporated herein by reference.

BACKGROUND OF THE INVENTION

1. Field of the Invention

The present disclosure generally relates to an optical input apparatus.

2. Description of the Related Art

Generally, portable electronic devices include portable terminals, MP3 players, Portable Multimedia Players (PMPs), and electronic books, and refer to devices by which users can access various contents while carrying the portable electronic devices.

The portable electronic devices are frequently used while users are mobile due to their portability and various functions associated with the devices. The designs of the portable electronic devices are diversified according to the present day demands and the needs of consumers. Accordingly, portable terminals equipped with various functions, such as bar type smart phones and tablet PCs, are increasingly being used today.

Specifically, as notebook or multimedia functions are included in a bartype portable terminal, various contents such as financial services, game/multimedia services, and wireless Internet services, including voice communications, can be enjoyed using the same portable terminal. In the case of the bar-type portable terminal, a unit for inputting data and a data output unit for displaying an image are embodied as one large-sized display panel on a front surface of the portable terminal.

Touch inputs are widely used in display panels. However, new types of inputs are increasingly being utilized. For example, an input unit using light, such as an optical mouse, has been proposed. An input unit using a light source according to the related art is illustrated in FIGS. 1, 2, 3A, and 3B. FIGS. 1 and 2 are views illustrating an optical pen according to the related art. Referring to FIGS. 1 and 2, the optical pen 10 includes a pen body 11, a pen tip 12, a light source 13, and an image sensor 14. The pen tip 12 protrudes from a front surface of a distal end of the optical pen 10. The light source 13 emits light towards a screen of a display apparatus 20 that is spaced apart from the pen tip 12. The light emitted from the light source 13 is reflected by the screen of the display apparatus 20, and is received by the image sensor 14 of the optical pen 10. Then, a pattern P (FIG. 3B) of the display apparatus 20 is received by the image sensor 14. A controller 15 calculates a change of a location of the optical pen 10 as a function of the pattern P received by the image sensor 14 to output a picture or a letter. FIGS. 3A and 3B are views illustrating a reflective pattern P and an image pattern P received by the image sensor 14. Referring to FIGS. 3A and 3B, in the case of the optical pen 10, deviations are detected in the brightness of light detected by the image sensor 14 according to an inclination angle of the optical pen 10. In an extreme case, the image pattern P detected by the image sensor 14 becomes so dark that errors may be frequently generated when a location of the pattern is determined (it can be seen that the pattern on the right of FIG. 3B is darker than the pattern on the left of FIG. 3B). A locally saturated area D in which light is concentrated in the image pattern P detected by the image sensor 14 is generated. That is, when a user uses the optical pen 10, the optical pen 10 is inclined with respect to a screen of the display apparatus 20. Accordingly, if the body 11 is inclined in a light emitting direction of the light source 13, for example, to the left of the pen tip 12 unlike the case in which the body 11 contacts the screen perpendicularly, light is intensively saturated in a right portion of the screen so that the brightness of the screen is higher or a locally saturated area D, in which light is saturated is generated. That is, the brightness of light is extremely high in the light emitting direction of the light source 13, and thus a locally saturated area is generated. Accordingly, if a local saturation is generated, the image sensor 14 cannot recognize the pattern P, and fails to recognize a point location or a movement of the pen tip 12, decreasing reliability according to a pointing direction of the optical pen 10.

Further, when the light emitted from the light source 13 is reflected by the screen when the optical pen 10 is inclined, it is scattered according to a surface of the screen so that the brightness of an image decreases and the brightness of the pattern detected by the image sensor also decreases, making it possible to recognize the pattern.

In addition, the light emitted from one light source 13 requires a high power consumption to realize a bright image with a short exposure time. Thus, a battery may be exhausted in a short time by a power source provided in the light source 13 or one light source 13 will fail to provide a brighter image.

SUMMARY OF THE INVENTION

The present invention has been made to address at least the problems and disadvantages described above, and to provide at least the advantages described below. Accordingly, aspects of the present invention provide an optical input apparatus that prevents generation of a locally saturated area of a pattern received by an image sensor according to a change of an external environment such as an inclination of the optical input apparatus.

Another aspect of the present invention provides an optical input apparatus that constantly maintains an image brightness as the optical input apparatus is inclined, prevents a local saturation, and allows a clear pattern to be detected by an image sensor.

Another aspect of the present invention provides an optical input apparatus that detects a brighter image even for a short exposure time, and reduces power consumption for an increase in the brightness of light of light sources.

Another aspect of the present invention provides an optical input apparatus that clearly recognizes a pointing location of the optical input apparatus.

In accordance with an aspect of the present invention, an optical input apparatus is provided. The optical input apparatus includes a body including an image sensor; a plurality of light sources provided in the body to emit light; and a controller configured to control emission of light by the plurality of light sources as a function of a pattern received by the image sensor, wherein the light sources selectively emit light according to a location of a local saturation of reflected light received by the image sensor.

In accordance with another aspect of the present invention, t an optical input apparatus is provided. The optical input apparatus includes a plurality of light sources configured to selectively emit light as the optical input apparatus is inclined.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
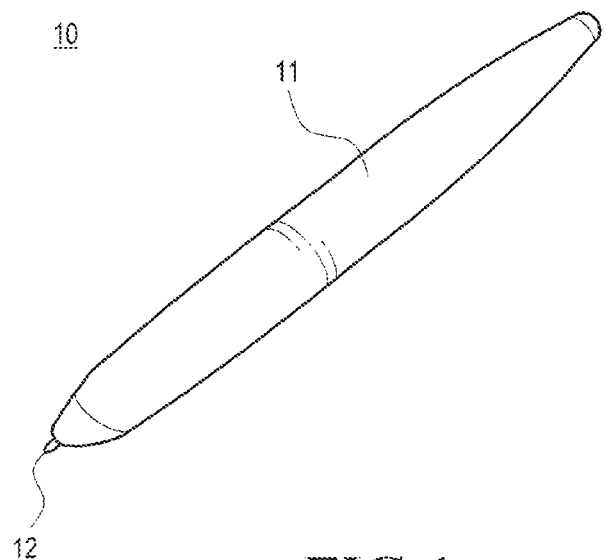
FIGS. 1 and 2 are views illustrating an optical pen in accordance with the related art.
Figure 2:
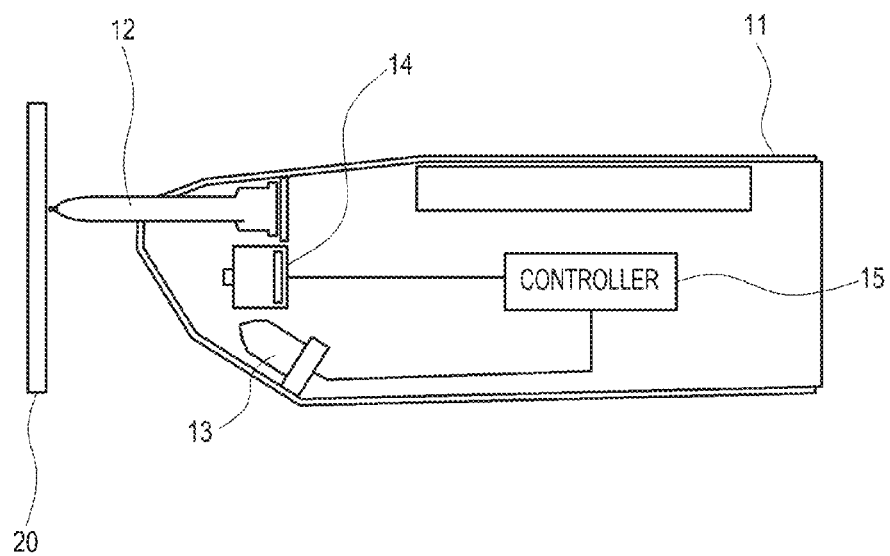
Figure 3A:
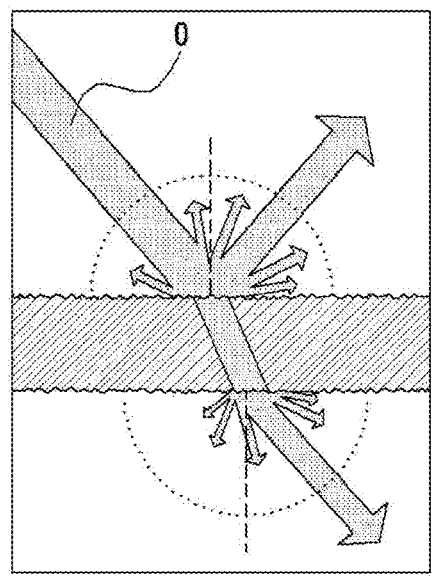
FIGS. 3A to 3B are views illustrating a light emitting form of a light source and a locally saturated area generated in an image sensor in accordance with the related art.
Figure 3B:
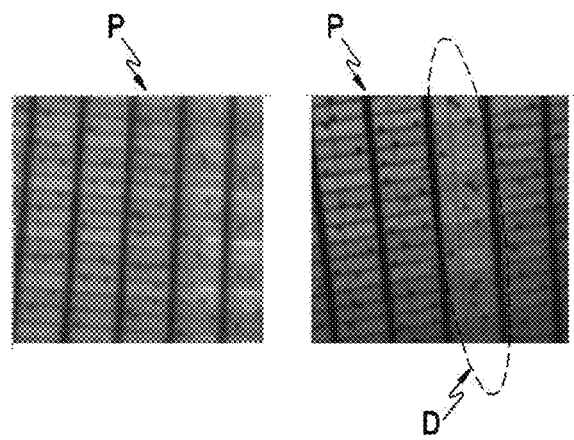

Hereinafter, embodiments of the present invention will be described with reference to the accompanying drawings. In the description, thicknesses of lines shown in the drawings and sizes of constituent elements may be exaggerated for clarity and convenience. Further, the following terms are defined considering their functions in the present disclosure and may be varied according to intentions and customs of a user or manager. Thus, the terms should be defined based on the contents of the entire disclosure. Further, although ordinal numbers such as first and second are used in the description of the embodiments of the present invention, their sequence may be arbitrarily determined and the description of the preceding elements may be applied to the description of the succeeding elements.

One aspect of an optical input apparatus according to an embodiment of the present invention is that a decrease in the brightness of a pattern detected by an image sensor can be prevented as the optical input apparatus is inclined when the user uses the optical input apparatus and a pattern of a bright image can be realized by providing the optical input apparatus with a plurality of light sources. Another aspect of the optical input apparatus according to an embodiment of the present invention is that a clear pattern can be detected by the image sensor so that a definite location can be determined by preventing a locally saturated area generated when the optical input apparatus is inclined.

Figure 4:
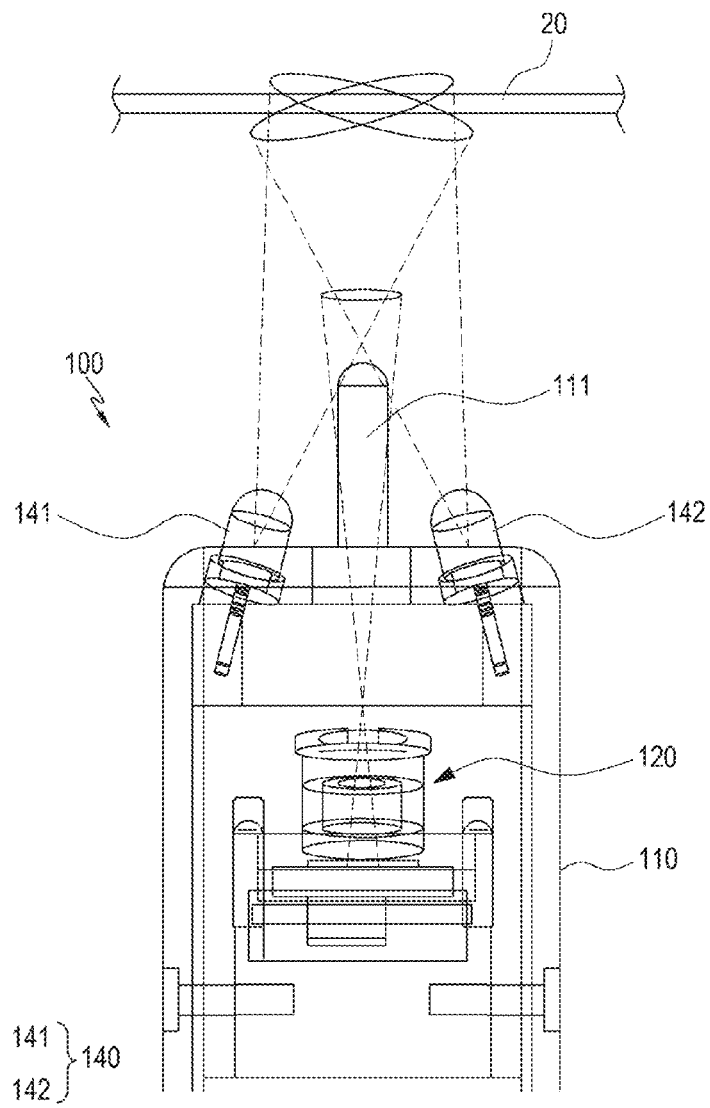
FIG. 4 is a view schematically illustrating an optical input apparatus in accordance with an embodiment of the present invention.
Figure 5:
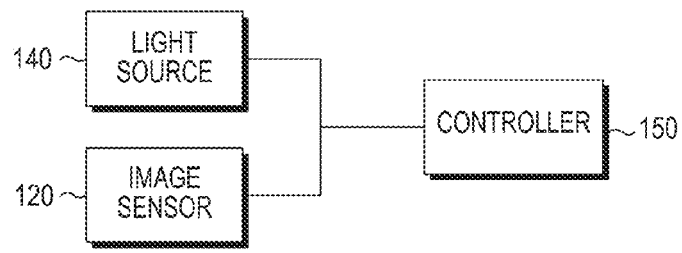
FIG. 5 is a block diagram of FIG. 4.
Figure 6:
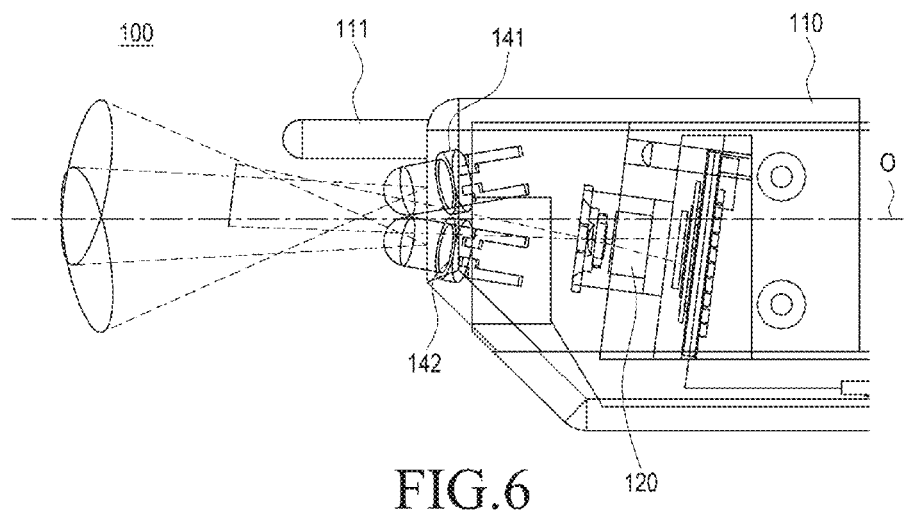
FIG. 6 is a view schematically illustrating light sources of the optical input apparatus of FIG. 4 according to an embodiment of the present invention.

FIG. 4 is a view schematically illustrating an optical input apparatus 100 in accordance with an embodiment of the present invention, and FIG. 5 is a block diagram of FIG. 4, and FIG. 6 is a view schematically illustrating light sources of the optical input apparatus of FIG. 4. Referring to FIGS. 4-6 the optical input apparatus 100 is provided with a plurality of light sources 140 such that a dark pattern may be prevented from being detected by an image sensor 120, which will be described below. That is, a bright pattern may be received when the optical input apparatus 100 is inclined. Further, the plurality of light sources 140 selectively emit light according to their locations so that a locally saturated area of a pattern generated as the optical input apparatus 100 is inclined can be prevented. Furthermore, the light sources 140 are tilted at a predetermined angle so that a reduction in the brightness of the pattern detected by the image sensor 120, as the optical input apparatus 100 is used, may be prevented and generation of a locally saturated area in which light is concentrated at a specific location, as the optical input apparatus 100 is inclined, may be prevented. The optical input apparatus 100 includes a body 110, light sources 140, and a controller 150.

The body 110 has a shape that can be easily gripped by a hand of a user. For example, a cross-section of the body 110 has various pen shapes such as a circle or a polygon. The plurality of light sources 140 are provided at a front side of an interior of the body 110, and the image sensor 120, the controller 150, and an internal circuit board (not shown) are provided within the body 110. A pen tip 111 protrudes from a front tip end of the body 110 to contact a screen 20 of a display apparatus. If the pen tip 111 contacts the screen 20, a display is generated on the screen 20, which the pen tip 111 contacts, and a user can provide a natural input as if he or she was using a conventional pen. In this way, the light sources 140 and the image sensor 120 recognize a pointing location at which the pen tip 111 contacts the screen 20 or a movement of the pen tip 111 along the screen 20. The image sensor 120 may be located on a central axis O of the body 110, and the light sources 140 are located along a periphery of the image sensor 120. Thus, when the optical input apparatus 100 is viewed from a front side of the body 110, the image sensor 120 is disposed on the central axis O of the body 110, the pen tip 111 protrudes from a front side of the body 110 at an upper side of the image sensor 120, and the light sources 140 are arranged along the periphery of the central axis O of the body 110.

Specifically, the image sensor 120 is disposed within the body 110 close to the front surface of the body 110 to receive light reflected by the screen 20. A pattern of the reflected light is received by the image sensor 120, and the optical input apparatus 100, more specifically, the pen tip 111, converts a contact location of the screen 20 into an electrical signal through the pattern of the received light. The pattern detected by the image sensor 120 is analyzed by the controller 150 in response to an electrical signal converted and output by the image sensor 120. As a result, a pointing location, a movement direction, and/or a distance of the optical input apparatus 100 from the screen 20 may be clearly determined. That is, a value corresponding to the light received by the image sensor 120 is calculated by the controller 150, and a pointing location of the optical input apparatus 100 or a location change during movement of the optical input apparatus 100 is determined. In an embodiment of the present invention the image sensor 120 is arranged close to or at the central axis O of the body 110, is configured to receive the light reflected by the screen 20, and is inclined toward the pen tip 111 to be pointed toward a location of the pen tip. However, the present disclosure is not limited thereto, and it will be apparent to those of ordinary skill in the art that a location, a configuration, and a mounting type of the image sensor 120 may be arbitrarily changed according to a location of the pen tip 111 or constituent elements of the optical input apparatus 100.

The controller 150 calculates a location and a movement of the optical input apparatus 100 through a signal converted by the image sensor 120, and controls the light sources 140 to selectively emit light according to an input value of the pattern received by the image sensor 120. That is, the controller 150 decreases the brightness of light emitted from some of the plurality of light sources 140 or switches off some of the light sources 140 and increases the brightness of the light emitted from the remaining light sources 140 or switches off the remaining light sources 140 according to an inclination direction or angle of the body 110 or the brightness of the pattern received by the image sensor 120 during use of the optical input apparatus 100. Accordingly, as the body 110 is inclined, the brightness of a pattern detected by the image sensor 120 becomes dark or a local saturation is generated in the pattern in a predetermined inclination angle range. Thus, the light sources 140 provided on one side of the central axis of the body 110 are switched off or the brightness of their light is decreased and the light sources 140 located on the opposite side are switched on or the brightness of their light is increased according to the inclination direction or angle, so that the brightness of the pattern received by the image sensor 120 is increased and generation of the locally saturated area is prevented. Accordingly, the image sensor 120 receives light exhibiting a constant brightness or a brightness by which a pattern may be clearly identified, and receives a constant and clear pattern in which a local saturation is not generated, so that an accurate location or a movement of the optical input apparatus 100 may be determined.

Figure 7:
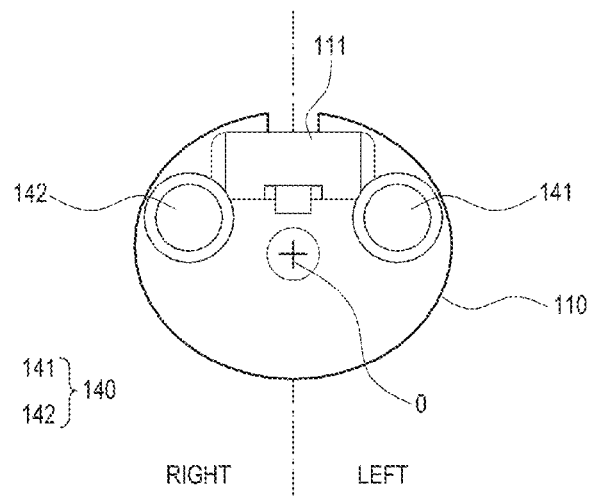
FIG. 7 is a view schematically illustrating a front surface of the optical input apparatus of FIG. 4 according to an embodiment of the present invention.
Figure 8:
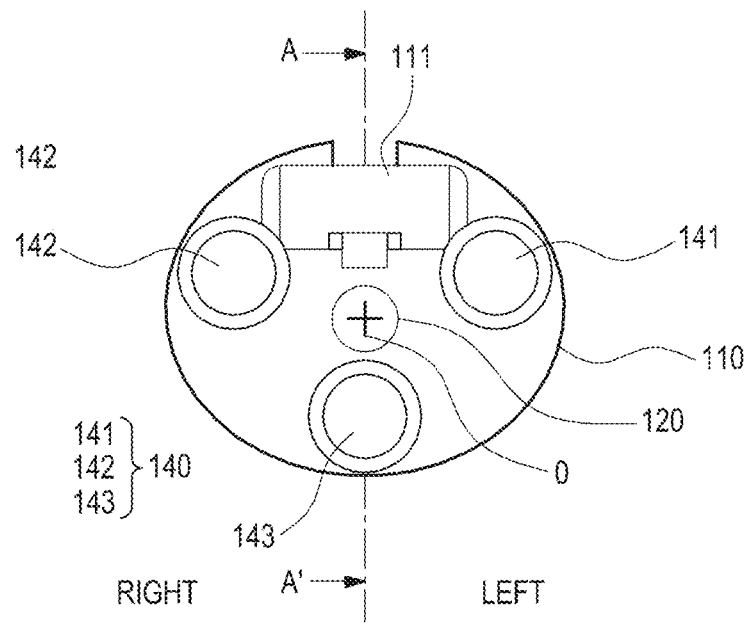
FIG. 8 is a view illustrating an optical input apparatus in which three light sources are provided according to an embodiment of the present invention.
Figure 9:
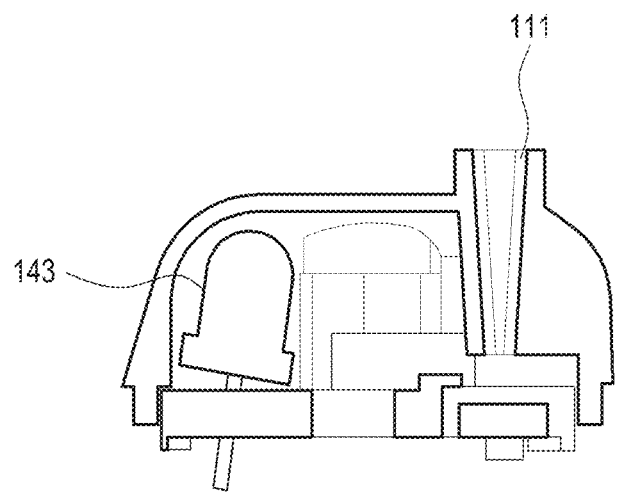
FIG. 9 is a sectional view along line A-A' of FIG. 8.
Figure 10:
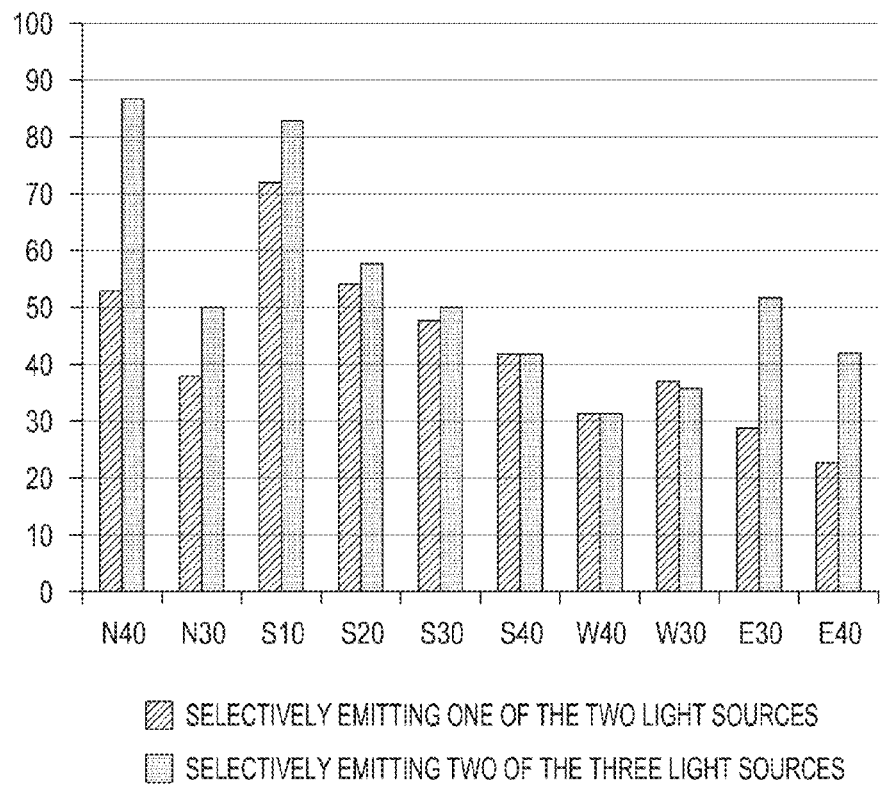
FIG. 10 is a graph depicting differences in brightness according to inclinations of light sources when two light sources and three light sources are provided in the optical input apparatus according to an embodiment of the present invention.
Figure 11:
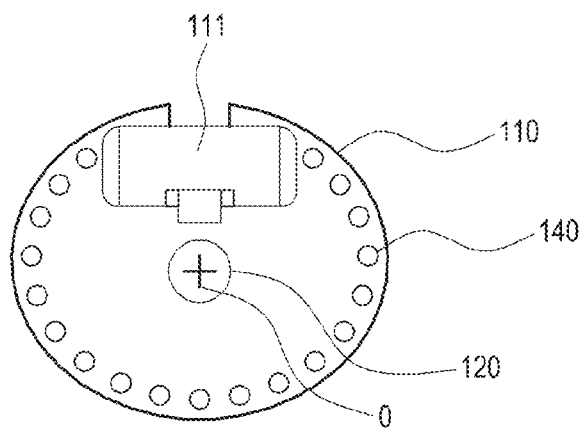
FIG. 11 is a view illustrating an optical input apparatus in which a plurality of light sources are provided according to an embodiment of the present invention.

FIGS. 4 to 12 illustrate examples of a plurality of light sources. Referring to FIGS. 4 to 12, the plurality of light sources 140 emit light from a front surface of the body 110 to the screen 20 which the pen tip 111 contacts. The optical input apparatus 100 may be provided with, for example, two or more light sources 140 that emit light toward the display screen 20. In particular, FIGS. 4, 6, and 7 are views illustrating an embodiment in which the optical input apparatus is provided with two light sources, FIGS. 8 and 9 are views illustrating an embodiment in which the optical input apparatus is provided with three light sources, and FIG. 11 illustrates an embodiment in which that the optical input apparatus is provided with four or more light sources. The light sources 140 (FIGS. 4 to 12) are disposed at a front end of the body 110 and are located along a periphery of the central axis O of the body 110. The light emitted by the light sources 140, that is, the switching on or off of the light sources 140 or the brightness of light emitted by the light sources 140 is selectively regulated by the controller 150. In particular, the body 110 is inclined in one direction with respect to the screen 20 according to an environment in which the user uses the optical input apparatus 100. Then, as the light is emitted from the light sources 140 in a direction in which the body 110 is inclined, the brightness of the pattern detected by the image sensor 120 becomes dark or a locally saturated area in which light is extremely saturated at a portion of the pattern detected by the image sensor 120 is generated in a predetermined angle range. Thus, the optical input apparatus 100 prevents a locally saturated area in which a dark pattern is detected or light is concentrated, and allows the pattern at a specific location to be clearly detected by the image sensor 120. That is, the intensity of light is regulated such that some of the light sources 140 are switched off or the intensity of their light is decreased, and the remaining light sources 140 are switched on or the intensity of their light is increased based on an inclination of the locally saturated area. For example, as described below, when the optical input apparatus 100 is inclined leftward in a state in which the light sources 141 (i.e., the light sources located on the left side of FIG. 4 and on the right side of FIGS. 7 and 8, and hereinafter, referred to as 'the first light sources 141') provided on the left side with respect to the central axis of the body 110 (more specifically, with reference to a state in which the optical input apparatus 100 contacts the screen 20) are switched off and the light sources 142 (i.e., the light sources located on the right side of FIG. 4 and on the left side of FIGS. 7 and 8, and hereinafter, referred to as 'the second light sources 142') provided on the right side are switched on. A locally saturated area is generated in a pattern detected by the image sensor 120 in a predetermined angle range, more specifically, around the left 10° to 20° and the pattern detected by the image sensor 120 becomes dark around a predetermined angle. Accordingly, the controller 150 controls the switching on or off of the light sources 140 and the number or the brightness of the light sources 140 according to locations of the light sources 140. If the second light sources 142 are switched off and only the first light sources 141 emit light, a pattern, in which a local saturation is not generated, is detected by the image sensor 120, and the brightness of the pattern detected by the image sensor 120 is increased by regulating the number or brightness of the light sources 140. The light sources 140 prevent a location saturation because the light emitted from the light sources 140 to the screen 20 is reflected by the screen 20. The locations and types of light sources 140, and the tilting angles or directions may be arbitrarily changed such that a pattern of a bright image may be detected by the image sensor 120. In an embodiment of the present invention, the light sources 140 are located along a periphery of the central axis O of the body 110. For example, two light sources may be located on opposite sides of the central axis O of the body 110 (FIG. 7), three light sources may be located at locations corresponding to triangular corners with respect to the central axis O of the body 110 (FIG. 8), or a plurality of light sources may be disposed adjacent to each other on the periphery of the central axis O of the body 110 (FIG. 11). The light sources 140 may also be tilted toward the central axis O of the body 110, more specifically, toward the image sensor 120 so that the light reflected on the screen 20 may be easily detected by the image sensor 120.

FIGS. 4, 6, and 7 illustrate the embodiment in which two light sources are provided. Since the contents of FIG. 4 have been described, the two light sources 150 will now be described with reference to FIGS. 6 and 7. FIG. 6 is a view schematically illustrating the light sources 140 of the optical input apparatus of FIG. 4, and FIG. 7 is a view schematically illustrating a front surface of the optical input apparatus of FIG. 4. Referring to FIGS. 6 and 7, in the embodiment of the present invention, the plurality of light sources 140 include a first light source 141 and a second light source 142. The first light source 141 and the second light source 142 are provided on opposite sides of the central axis O of the body 110, that is, on the left and right sides of the central axis O of the body 110 (referring to the left and right sides of the front surface of the body 110 of FIG. 7). The first light source 141 and the second light source 142 are spaced apart from each other on opposite sides of the pen tip 111. The first light source 141 and the second light source 142 are tilted toward the central axis O of the body 110. A tilting angle (hereinafter, referred to as 'the first tilting angle') by which the light sources 140 are tilted with respect to the central axis O of the body 110 ranges from 0° to 20°, and preferably, ranges from 15° to 17°. Accordingly, when the optical input apparatus 100 is inclined leftward and the right light sources having a first tilting angle are switched on, a pattern having a brighter image may be detected by the image sensor 120. Alternatively, when the optical input apparatus 100 is inclined rightward and the second light sources 142 having the first tilting angle are switched on, a pattern having a brighter image may be detected by the image sensor 120. That is, the light emitted from the light sources 140 should be projected to the screen closest to a surface of the screen, more specifically, to the front surface of the screen, in which case when the input apparatus 100 is tilted rightward, the first light source 141 is tilted rightward to be projected to the screen, closer to the front surface of the screen than the second light source 142 as tilted leftward. Accordingly, when the input apparatus 100 is inclined rightward, a pattern of a bright image may be detected by the image sensor 120 if the first light source 141 is switched on.

Likewise, when the input apparatus 100 is tilted leftward, the second light source 142 is tilted leftward to be projected to the screen, closer to the front surface of the screen than the first light source 141 as tilted rightward.

Accordingly, when the input apparatus 100 is inclined leftward, a pattern of a bright image may be detected by the image sensor 120 if the second light source 142 is switched on. That is, the light emitted from the first light source 141 and the second light source 142 tilted toward the central axis O of the body 110 is reflected on the screen 20, which the pen tip 111 contacts, and the reflected pattern of a bright image may be accurately detected by the image sensor 120. The first light source 141 and the second light source 142 are tilted toward the central axis O of the body 110, and have a tilting angle (hereinafter, referred to as 'the second tilting angle') by which the first light source 141 and the second light source 142 are tilted upward and downward about the optical axis of the light emitted from the light sources 140. That is, while the first light source 141 and the second light source 142 are tilted toward the central axis O of the body 110, the first light source 141 is tilted downward and the second light source 142 is tilted upward (see FIG. 6). For example, the first light source 141 may be first tilted by a first tilting angle of 0° to 20° rightward, more specifically, by a first tilting angle of 15° to 17°, and secondly tilted by a second tilting angle of 0° to 15° upward, more specifically, by a second tilting angle of 9° to 12°. Further, the second light source 142 may be first tilted leftward by 0° to 20°, more specifically, by 15° to 17°, and secondly tilted upward by 0° to 15°, more specifically, 9° to 12°. Accordingly, when the input apparatus 100 is inclined toward the upper side of the screen 20, a bright image may be detected by the image sensor 120 as the first light source 141 tilted downward emits light, and when the input apparatus 100 is inclined toward the lower side of the screen, a bright image may be detected by the image sensor 120 as the second light source tilted upward emits light.

Although it has been described in the embodiment of the present invention that the first light source 141 is tilted downward and the second light source 142 is tilted upward, the present disclosure is not limited thereto. That is, various modifications may be made.

For example, the first light source 141 may be tilted upward and the second light source 142 may be tilted downward. Further, the number, dispositions, or tilting angles of the light sources 140 are not limited to the embodiments of described above. It is preferable to adjust the locations and tilting angles (including the first tilting angle and the second tilting angle) such that a pattern is optimally detected by the image sensor 120. That is, the tilting angles and tilting directions of the first and second light sources 141 and 142 are provided to make a pattern detected by the image sensor 120 bright and to clearly project light without causing a locally saturated area. The dispositions, configurations, and tilting of the light sources 140 may be variously modified by a configuration for optimizing a pattern detected by the image sensor 120, that is, when the pen tip 111 contacts the screen 20, the light emitted from the light sources 140 is concentrated on the screen 20 at a contact location of the pen tip 111, the pattern provided at the concentrated location has a bright image to easily detect a location or a movement of the pattern, and the pattern can be clearly detected by the image sensor 120 while having an image without a locally saturated area. The light sources 140 selectively emit light according to an inclination of the body 110. Here, "the selective emitting of light" includes a state in which the first light source 141 and the second light source 142 both emit light. That is, it includes a state in which the first light source 141 and the second light source 142 are alternately switched on and off according to a location of the locally saturated area or the brightness of one of the first and second light sources 141 and 142 increases and the brightness of the other light source 141 or 142 decreases.

Thus, when the body 110 is viewed from the front side, the pen tip 111 is disposed on an upper side of the central axis O of the body 110, and the first light source 141 and the second light source 142 are disposed on opposite sides of the pen tip 111 to be spaced apart from the pen tip 111 and are disposed on opposite sides of the central axis O of the body 110. When a local saturation is generated in a predetermined angle range as the pen tip 111 is inclined to one side, such as, for example, leftward while the pen tip 111 contacts the screen 20, the first and second light sources 141 and 142 emit light rightward. Then, when the inclination angle of the optical input apparatus 100 is in a predetermined angle range, light is locally saturated in a right area of the pattern detected by the image sensor 120. Accordingly, the second light source 142 provided on the right side with reference to a direction in which the body 110 is used is switched off. Alternatively, the brightness of the light emitted by the second light source 142 is decreased. Also, the first light source 141 provided on the left side is switched on. As a result, a locally saturated area is prevented so that the pattern detected by the image sensor 120 is clear because the brightness of the left area of the image sensor 120 increases. The same phenomenon is realized in the opposite case.

FIG. 8 is a view illustrating another embodiment of the present invention, in which three light sources are provided, and FIG. 9 is a sectional view along line A-A' of FIG. 8. In the following description with reference to FIGS. 8 and 9, the above-described functionalities apply to the repeated constitutions or structures. In this embodiment, three light sources 140 are disposed along a periphery of the central axis O of the body 110. Similar to the above-described embodiment, in which two light sources are provided, when three or more light sources are provided, a locally saturated area generated in a pattern detected by the image sensor 120 is avoided, a brighter image is provided, and the image sensor processes the pattern more usefully.

Specifically, the light sources 140 include a first light source 141, a second light source 142, and a third light source 143, and the first, second, and third light sources 141, 142, and 143 are formed at a periphery of the central axis O of the body 110 adjacent to each other. The first, second, and third light sources 141, 142, and 143 are tilted toward the central axis O of the body 110. The first, second, and third light sources 141, 142, and 143 may be tilted toward the upper or lower side of the first tilting direction to optimize the pattern detected by the image sensor 120. For example, the first and second light sources 141 and 142 may be tilted upward, the third light source 143 may be tilted downward, and the first, second, and third light sources 141, 142, and 143 may be tilted far away from each other. That is, the first, second, and third light sources 141, 142, and 143 may be tilted in various ways. With respect to the disposition of the three light sources 141, 142, and 143, the pen tip 111 is disposed on the upper side of the central axis O of the body 110, the first light source 141 and the second light source 142 are disposed on opposite sides of the central axis O of the body 110 to be spaced apart from opposite sides of the pen tip 111 adjacent to the opposite sides of the pen tip 111, and the third light source 143 is disposed adjacent to the first and second light sources 141 and 142 on an opposite side of the pen tip 111. Accordingly, the first, second, and third light sources 141, 142, and 143 are disposed at corners of an inverted triangle about the central axis O of the body 110, with the first and second light sources 141 and 142 being provided on the upper side, and the third light source 143 being provided on the lower side. However, the locations or tilting angles of the first, second, and third light sources 141, 142, and 143 are not limited thereto, but may be variously modified according to the shape of the pattern detected by the image sensor 120.

The first, second, and third light sources 141, 142, and 143 selectively emit light according to an inclination direction or angle of the body 110. For example, a locally saturated area of light is prevented by switching off one inclined light source and switching on the remaining light sources, or decreasing the intensity of light of the inclined light source and increasing the intensity of the light of the remaining two light sources. For example, if the optical input apparatus 100 is inclined leftward in a state in which the pen tip 111 of the optical input apparatus 100 contacts the screen 20, a pattern having a clear image is detected by the image sensor 120 within a predetermined inclination angle range of the optical input apparatus 100, but a locally saturated area in which light is intensively saturated is generated in a predetermined angle range. Further, a pattern having a dark image is detected by the image sensor 120 in the predetermined angle. Accordingly, the controller 150 switches off the second light source 142 provided on the right side of the body 110 or decreases the brightness of light emitted from the second light source 142. For example, by switching off or decreasing the brightness of the second light source 142, and allowing only the first and third light sources 141 and 143 to emit light, the image of the pattern detected by the image sensor 120 becomes brighter and a saturation of a local pattern is prevented so that the image of the pattern becomes clearer.

Alternatively, that is, when the optical input apparatus 100 is inclined rightward in a state in which the pen tip 111 of the optical input apparatus 100 contacts the screen 20, the first, second, and third light sources 141, 142, and 143 emit light intensively toward the left side of the screen. Further, at an angle range by which the optical input apparatus 100 is inclined more, a pattern of a dark image is detected by the image sensor 120. Accordingly, the controller 150 switches off or decreases the brightness of the first light source 141 provided on the left side of the body 110. Accordingly, the first light source 141 is switched off or its brightness is decreased, and only the second and third light sources 142 and 143 emit light, so that a bright image can be detected by the image sensor 120 and a clear pattern in which a locally saturated area is not generated can be detected.

FIG. 10 illustrates a graph for comparing brightness differences when two light sources and three light sources are provided in the optical input apparatus. Referring to FIG. 10, it can be seen that, as compared with the embodiment in which only one of the two light sources 140 selectively emits light in the optical input apparatus 100 having two light sources 140, a pattern of a brighter image can be detected by the image sensor 120 and power consumption can be lowered when two of the three light sources 140 selectively emit light in the optical input apparatus 100 having three light sources 140. E, W, S, N of FIG. 10 represent East, West, South, and North, and denote the left, right, downward, and upward directions, respectively, in a state in which the optical input apparatus 100 contacts the screen 20. Accordingly, when the optical input apparatus 100 is inclined to the East, that is, leftward by 30° in the optical input apparatus 100 having two light sources 140, the second light source 142 located on the right side is switched off and the brightness of the first light source 141, when only the first light source 141 emits light, is about 30. However, in the optical input apparatus 100, including three light sources 140, having the same inclination, the brightness of the optical input apparatus 100 exceeds 50 when the second light source 142 is switched off and the first and third light sources 141 and 143 emit light. Thus, when the power consumption is the same, a brighter image pattern can be obtained when two of the three light sources 140 selectively emit light as compared with when one of the two light sources 140 selectively emits light. Accordingly, when a pattern of the same brightness is detected by the image sensor 120, the power consumption of the optical input apparatus 100 that selectively controls three light sources is lower than the power consumption of the optical input apparatus 100 that selectively controls two light sources. The light sources 140 may include light emitting diodes (LEDs). However, the present invention is not limited thereto and any light source may be used as long as the patterns emitted from the light sources can be detected by the image sensor 120.

FIG. 11 is a view illustrating an embodiment of the present invention in which a plurality of light sources are provided. Referring to FIG. 11, four or more light sources 140 are disposed at a periphery of a front surface of the body 110 adjacent to each other. The configuration of this embodiment is substantially similar to the configuration of the three light sources 140, described above. However, the number of light sources are different and a plurality of light sources selectively emit light according to an inclination direction of the optical input apparatus 100. When a plurality of light sources are provided, the plurality of light sources emit light even if the optical input apparatus is inclined so that the light sources 140 can be efficiently controlled according to their locations and a pattern having a brighter and clearer image can be achieved when a location saturation is generated as compared with the case in which two or three light sources are provided. That is, for example, as the optical input apparatus is inclined, some light sources 140 provided at inclined locations of the optical input apparatus 100 emit light, others are switched off, and/or the brightness of the remaining light sources 140 is decreased.

Figure 12A:
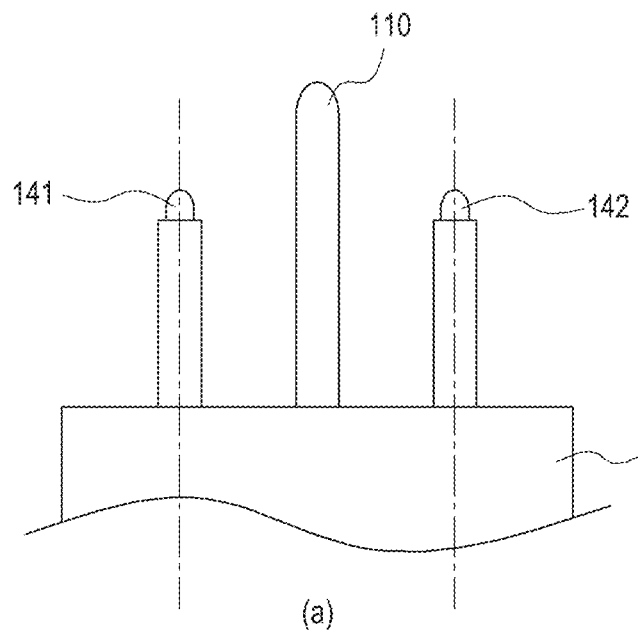
FIG. 12A illustrates a detailed view of a plurality of light sources and a tip of an optical input apparatus according to an embodiment of the present invention.
Figure 12A:
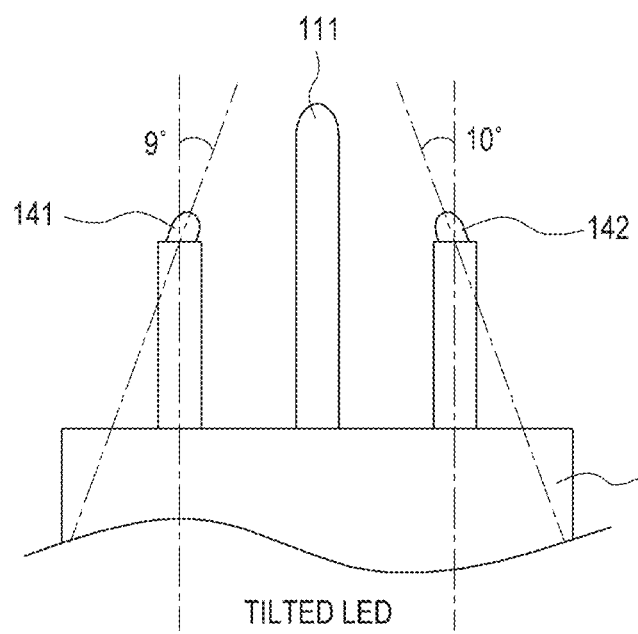

FIG. 12A illustrates a detailed view of the light sources 140 and the pen tip of the optical input apparatus according to an embodiment of the present invention and illustrates patterns received by the image sensor 120 as the light source is inclined in the optical input apparatus of the present invention. Referring to FIG. 12A, a case in which the plurality of light sources 140 selectively emit light as the optical input apparatus 100 is inclined will be described. Further, FIG. 12A exemplifies that the light sources 141 and 142 are provided on the left and right sides of the tip end 111 of the body of the optical input apparatus. The pen tip 111 is provided on the upper side while the user grips the optical input apparatus 100, a light source provided on the left side of the central axis O is referred to as a second light source 142 and a light source provided on the right side is referred to as a first light source 141.

Figure 12B:
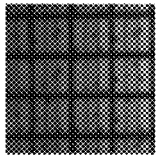
FIG. 12B illustrates patterns received by the image sensor as the light sources of the optical input apparatus are inclined, according to an embodiment of the present invention.

Referring to FIGS. 12A and 12B, the pen tip 111 perpendicularly contacts the display device while the user grips the optical input apparatus 100 with the pen tip 111 being located on the upper side. The optical input apparatus 100 is inclined leftward with the state being set to 0 degrees while the left light source 142 of the optical input apparatus is switched off and the right light source 141 is switched on. Accordingly, when the optical input apparatus 100 is inclined leftward by 0 to 10 degrees, the pattern detected by the image sensor 120 is clear. However, when the optical input apparatus 100 is inclined by 10 to 20 degrees, a locally saturated area is generated from the right side to the left side in the pattern detected by the image sensor 120. If the optical input apparatus 100 is inclined further, for example, if the optical input apparatus 100 is inclined by about 40 degrees, the locally saturated area is not generated and the pattern appears clearly in the image sensor 120. Accordingly, if the second light source 142, which has been switched off at an angle at which the local saturation is generated, is switched on and the first light source 141, which has been switched on, is switched off as the optical input apparatus 100 is inclined leftward, a locally saturated area generated in the pattern detected by the image sensor 120 is prevented. Accordingly, a clear pattern is detected by the image sensor 120, and the image sensor 120 easily determine a location or a movement path of the pen tip 111. That is, when the optical input apparatus 100 is inclined leftward, the second light source 142 is switched at an inclination of 10 to 20 degrees, and when the first light source 141 is switched off, a location saturation of the pattern detected by the image sensor 120 is prevented. Further, if three light sources are provided, a locally saturated area is generated in the pattern detected by the image sensor 120 at a predetermined inclination range when the optical input apparatus 100 starts to be inclined leftward in a state in which the leftmost light source is switched off and the remaining two light sources 140 are switched on. Accordingly, if the leftmost light source that has been switched off is switched on and the rightmost light source is switched on, a locally saturated area is not generated in the case of two light sources and a clear pattern can be detected by the image sensor. Further, a clear pattern having a bright image is detected by the image sensor 120, when compared with the case of two light sources, and low power consumption is achieved, when compared with the case in which the brightness increases by using one light source. The switching on/off functionality of the light sources is also the same in the case of four or more light sources, but power consumption for obtaining a clear pattern having the same brightness can be further reduced and a clear pattern of a brighter image can be obtained.

Thus, since a plurality of light sources are provided to be switched on or off at an angle at which a locally saturated area is generated, a locally saturated area can be prevented in a pattern detected by an image sensor. Further, since the light sources are tilted at a predetermined angle, a pattern with a brighter image is detected by the image sensor.

Since a plurality of light sources at a periphery of the image sensor selectively emit light or the brightness of the light emitted from the light sources is controlled in the optical input apparatus, a local saturation of the light detected by the image sensor is prevented.

Accordingly, even when the optical input apparatus is inclined to one side, the image sensor can detect a clear pattern. Thus, a pointing location of a pen tip or a movement of the pen tip can be accurately displayed, and the reliability of the optical input apparatus is improved.

Further, since a plurality of light sources are formed, power consumption for providing the same brightness can be lowered, and when the same amount of electric power is provided, the brightness thereof increases.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An optical input apparatus comprising:
   a body including an image sensor;
   a plurality of light sources provided on the body to emit light; and
   a controller configured to control the plurality of light sources based on a pattern detected by the image sensor,
   wherein the plurality of light sources selectively emit light according to a generation of a local saturation of light received by the image sensor.

2. The optical input apparatus of claim 1, wherein the plurality of light sources are disposed on a front side of the body along a periphery of a central axis of the body.

3. The optical input apparatus of claim 2, wherein the controller decreases the brightness of the light of at least one of the plurality of light sources in an inclination direction of the body or switches off at least one of the plurality of light sources in the inclination direction of the body, and increases the brightness of the light of at least another one of the plurality of light sources in an opposite direction or switches on at least another of the plurality of light sources in the opposite direction.

4. The optical input apparatus of claim 2, wherein the plurality of light sources are tilted toward the central axis of the body.

5. The optical input apparatus of claim 4, wherein tilting angles of the plurality of light sources range from 10° to 20°.

6. The optical input apparatus of claim 4, wherein the plurality of light sources are secondly tilted to intersect each other upward and downward about an optical axis center.

7. The optical input apparatus of claim 6, wherein the plurality of light sources have a second tilting angle of 5° to 15°.

8. The optical input apparatus of claim 2, wherein the plurality of light sources comprise:
   a first light source provided on one side of the central axis of the body; and
   at least one second light source provided on an opposite side of the central axis of the body to be spaced apart from the first light source.

9. The optical input apparatus of claim 8, wherein when the body is inclined toward the first light source, the controller switches off the first light source and switches on the second light source, and when the body is inclined toward the second light source, the controller switches off the second light source and switches on the first light source.

10. The optical input apparatus of claim 8, wherein the first light source and the second light source are firstly tilted toward the central axis of the body, and are secondly tilted to the upper and lower sides of an optical axis direction.

11. The optical input apparatus of claim 8, wherein the light sources further comprise a third light source provided adjacent to the first light source and the second light source.

12. The optical input apparatus of claim 11, wherein at least one of the first light source, the second light source, and the third light source is controlled to selectively emit light by the controller.

13. The optical input apparatus of claim 1, wherein the plurality of light sources comprise light emitting diodes (LEDs).

14. An optical input apparatus, comprising:
a plurality of light sources,
wherein the plurality of light sources selectively emit light as the optical input apparatus is inclined, and
wherein the plurality of light sources are tilted about a central axis of the optical input apparatus.

15. The optical input apparatus of claim 14, further comprising a controller configured to control the plurality of light sources based on a pattern detected by the image sensor, and
wherein the controller decreases the brightness of the light of at least one of the plurality of light sources in an inclination direction of the body or switches off at least one of the plurality of light sources in the inclination direction of the body, and increases the brightness of the light of at least another one of the plurality of light sources in an opposite direction or switches on at least another of the plurality of light sources in the opposite direction.

* * * * *